(12) United States Patent
Demilie et al.

(10) Patent No.: US 8,457,140 B2
(45) Date of Patent: Jun. 4, 2013

(54) NETWORK ABSTRACTION GATEWAY AND CORRESPONDING METHOD TO ABSTRACT AN ENDPOINT

(75) Inventors: Amaury Jean Robert Demilie, Gesves (BE); Jordi Pierre Victor Serge Nelissen, Overijse (BE)

(73) Assignee: Escaux NV, Wavre (BE)

( * ) Notice: Subject to any disclaimer, the term of this patent is extended or adjusted under 35 U.S.C. 154(b) by 0 days.

(21) Appl. No.: 13/357,732

(22) Filed: Jan. 25, 2012

(65) Prior Publication Data

US 2012/0188892 A1 Jul. 26, 2012

(30) Foreign Application Priority Data

Jan. 25, 2011 (EP) ..................................... 11000569

(51) Int. Cl.
*H04L 12/28* (2006.01)
(52) U.S. Cl.
USPC ......................................................... 370/401
(58) Field of Classification Search
USPC ................. 370/401, 352, 353, 354, 355, 356, 370/465; 455/432.2, 435.1, 12.1, 435; 379/229, 379/230, 238
See application file for complete search history.

(56) References Cited

U.S. PATENT DOCUMENTS 6,515,997 B1 * 2/2003 Feltner et al. ................. 370/401
7,701,924 B1 * 4/2010 Bell et al. ...................... 370/352
2007/0070976 A1 3/2007 Mussman et al.
2008/0137646 A1 * 6/2008 Agarwal et al. ............... 370/352
2008/0287148 A1 11/2008 Silver et al.

FOREIGN PATENT DOCUMENTS
WO 2009076971 A1 6/2009

OTHER PUBLICATIONS

European Search Report issued on European Application 1100569.1, Jun. 29, 2011.
International Search Report and Written Opinion issued in PCT/EP2012/051044, Apr. 12, 2012.

* cited by examiner

*Primary Examiner* — Chi Pham
*Assistant Examiner* — Alexander O Boakye
(74) *Attorney, Agent, or Firm* — Workman Nydegger

(57) ABSTRACT

A network abstraction gateway includes at least one abstracted network interface for connectivity with an abstracted network wherein a user has an abstracted endpoint having a first identity in the abstracted network; a communication system interface for connectivity with at least one user's communication system and exposing abstracted endpoint behavior via a second identity in the user's communication system; means adapted to register a one-to-one relationship between the first identity and the second identity; means for extracting behavior of the abstracted endpoint; and endpoint abstraction means adapted to abstract the abstracted endpoint in the user's communication system via an endpoint abstraction using the second identity. The endpoint abstraction is responsive to behavior of the abstracted endpoint and is adapted to implement at least one feature and/or state of the user's communication system and to bi-directionally map the behavior of the abstracted endpoint.

11 Claims, 6 Drawing Sheets

NETWORK ABSTRACTION GATEWAY AND CORRESPONDING METHOD TO ABSTRACT AN ENDPOINT

FIELD OF THE INVENTION

The present invention generally relates to abstraction of an endpoint, e.g. a GSM client in a mobile handset, whereon a user is initiating and receiving communication sessions. The present invention shall enable the user to expose the behavior of the abstracted endpoint in the user's preferred communication system, e.g. an IP-PABX, when initiating or receiving communication sessions at the abstracted endpoint, e.g. his GSM client, in his preferred physical endpoint, e.g. his regular mobile handset. The present invention in other words shall enable abstraction of for instance all calls originating from or destined to a GSM client as if these calls were originated from or terminated at a phone or endpoint in the user's communication system. This way, the present invention paves the way to unified communications enabling the user of for instance any regular mobile handset to benefit from the applications he/she enjoys at his/her regular phone connected to his/her communication system, e.g. a private (corporate) PABX.

In a particular use case, the present invention enables users of an abstracted network, e.g. a GSM network, WiFi SIP network, Skype network, proprietary network, etc., to expose a SIP (Session Initiation Protocol) identity. The user can expose his preferred abstracted endpoint, e.g. his satellite client, GSM client, WiFi SIP client, Softphone client, DECT phone client, etc., as if it was connected to his communication system, e.g. the corporate IP based PABX which requires a SIP identity for IP connectivity.

BACKGROUND OF THE INVENTION

A known way to unify fixed and mobile communications relies on the so called IP Multimedia Subsystem or IMS architecture. United States patent application US 2010/0111079 entitled "Method and Apparatus for Network Based Fixed Mobile Convergence" (Duffy et al.) for instance describes such a network based IMS solution wherein the calls from both SIP (Session Initiation Protocol) endpoints and non-SIP endpoints are handled by a single application server.

IMS however requires dedicated endpoints such as UMTS phones that support SIP, or requires adaptation of existing phones through software updates. The solution known from US 2010/0111079 for instance requires installation of a Network Based Fixed Mobile Convergence (NB-FMC) client on the mobile device, and installation of a NB-FMC Application Server to invoke network based FMC service features such as call request handling. Because the user has to buy a new terminal supporting certain protocols or upgrade his existing terminal, deployment of IMS based solutions is a slow process, and the market penetration is small.

United States Patent Application US 2009/0262733 entitled "Dynamic Call Anchoring" (Olson) discloses an alternative prior art solution based on call anchoring logic that enables to make a call from a mobile handset (152 in FIG. 4 of US 2009/0262733) and to anchor the outbound call at the user's PBX (IP PBX 164 in FIG. 4 of US 2009/0262733), e.g. in the private enterprise network, a home-based network or a VoIP network. The call anchoring logic (172, 168) needed thereto resides in the mobile handset, in the private network, or in a combination of the mobile handset and private network, as is mentioned in paragraph [0025] of US 2009/0262733. As a result, Olson also has to modify the mobile handset and/or the private network.

International Patent Application WO 2009/076971 entitled "A Method of and an Arrangement for Call Establishment Between an Internet Communication Environment and a Mobile Communication Environment" describes a solution to extend GSM service, or more generally mobile service, to the Internet cloud. By emulating the user's mobile device 2 in gateway 6 as an Internet client and maintaining in gateway 6 the binding between the user's mobile identity, i.e. the MSISDN, and the Internet user name, e.g. John Smith, the user can establish/receive calls on his mobile device 2 that are maximally routed over the Internet 4 for cost saving reasons. As is indicated on page 2, lines 12-23 of WO 2009/076971, the user maintains mobility while the possibility of making calls free of charge over the Internet is maximally exploited. In order to further optimize costs, the status of the mobile device is maintained by the gateway 6, i.e. status parameters of the mobile device that may influence the costs of terminating calls thereon are maintained, like an indication that the user equipment is a mobile device, the geographical location, a cost indication, availability and messaging capacity.

WO 2009/076971 only teaches to extract some cost-related status parameters of the mobile device in order to use these status parameters to cost-optimize termination of calls to/from the user. The system disclosed in WO 2009/076971 does not enable the user to experience the status and features of his preferred communication system, e.g. his PBX, on his mobile 2. The gateway 6 known from WO 2009/076971 simply has no connectivity to such a preferred communication system, and also does not suggest to extend certain Internet behavior to the mobile device. The gateway 6 known from WO 2009/076971 consequently does not enable the user to bi-directionally enjoy PBX behavior on his mobile device, like for instance a directory, busy line notification, voice mail, etc., and enjoy mobile system behavior on his VoIP phone, like for instance SMS service. More generally, WO 2009/076971 does not extend features and states of the user's preferred communication system to the user's mobile endpoint since its objective is merely to reduce communication costs, not to extend features and states.

United States Patent Application US 2007/0070976 entitled "Mobile and Packet-Based Call Control" (Mussman et al.) is considered to constitute the closest prior art solution. US 2007/0070976 describes the presence of a Network Convergence Gateway (NCG) in a mobile network for delivering calls destined to VoIP phones to the corresponding mobile terminal, i.e. the GSM phone of the same user, and for extending services provided in the fixed network to the mobile network.

The NCG known from US 2007/0070976 however acts as a conventional Mobile Switching Centre (MSC) and SS7 gateway that contains VLR (Visitor Location Register) and routing functionality as is indicated by paragraph [0079] of US 2007/0070976. This NCG consequently is a rather complex, expensive, GSM specific node.

Another drawback of the NCG known from US 2007/0070976 is that this NCG only extends incoming calls to the user's GSM terminal, and consequently does not expose behavior of the GSM terminal in the fixed network when outgoing calls are made from the GSM terminal. The known NCG in other words does not enable bi-directional endpoint abstraction as a result of which it fails to expose abstracted endpoint behavior (or even presence) in the fixed network.

It is an objective of the present invention to disclose an improved solution for exposing behavior of an abstracted endpoint in the user's communication system, like for instance an application server, a PBX, an IP Centrex, a cloud-based PBX system, etc. More particularly, it is an objective of the present invention to disclose a network abstraction gateway and a corresponding method for endpoint abstraction that is not tied or limited to one particular technology like GSM, that enables to expose the abstracted endpoint's behavior in bi-directional communication, i.e. inbound and outbound from the point of perspective of the abstracted endpoint, that does not require software upgrades of endpoints or buying new, dedicated endpoints that support for instance SIP, and that does not rely on a complex node like the above mentioned NCG from Mussman et al. integrating MSC, VLR and routing functionality.

SUMMARY OF THE INVENTION

According to the present invention, the above defined objectives are realized by a network abstraction gateway, the network abstraction gateway comprising:
- at least one abstracted network interface for connectivity with at least one abstracted network wherein a user has an abstracted endpoint having a first identity in the abstracted network;
- at least one communication system interface for connectivity with at least one user's communication system, the communication system interface exposing abstracted endpoint behavior via a second identity in the user's communication system;
- means adapted to register a one-to-one relationship between the first identity and the second identity;
- means for extracting behavior of the abstracted endpoint, comprising communication features and/or states of the abstracted endpoint; and
- endpoint abstraction means adapted to abstract the abstracted endpoint in the user's communication system via an endpoint abstraction using the second identity, the endpoint abstraction being responsive to behavior of the abstracted endpoint, being adapted to implement at least one feature and/or state of the user's communication system, and being adapted to bi-directionally map the behavior of the abstracted endpoint with features and/or states of the user's communication system via a protocol supported by the user's communication system.

Thus, the network abstraction gateway (NAG) according to the present invention realizes endpoint abstraction by generating an endpoint abstraction in a communication system exposing behavior of the abstracted device. The user may optionally login for the NAG service to order the NAG and eventually the abstracted network(s) to use the NAG service. The behavior of the abstracted device in the context of the current invention entails the communication features and/or states of the abstracted endpoint, like for instance the ringing state, call acceptance, etc. When the user has logged in for the network abstraction service, the network abstraction gateway shall extract the abstracted endpoint's behavior and abstraction software in the network abstraction gateway shall map the abstracted endpoint's behavior onto a comparable set of features or states of the endpoint abstraction. Vice versa, features and states in the user's communication system, e.g. PBX or application server features typically implemented as state machines on the PBX, are extracted and extended to the abstracted endpoint. It is noticed that a single physical endpoint, e.g. a mobile handset, can contain several abstracted endpoints that are each connected to different abstracted networks. The abstracted endpoints can for example be a GSM client with connectivity to a GSM network, i.e. a first abstracted network, an SMS client with connectivity to an SMS network, i.e. a second abstracted network, etc. all residing in the same mobile handset. Thus, the behavior of plural abstracted endpoints may be mapped or unified by the network abstraction gateway according to the present invention into multiple behaviors of a single endpoint abstraction, e.g. a single SIP endpoint in the user's communication system. The endpoint abstraction is an endpoint in the user's communication system able to expose behavior in this communication system through a dedicated protocol, e.g. SIP. The user's communication system can for example be an application server (AS), a private enterprise network, a web-based VoIP application like Google Voice, etc. By mapping the behavior of the user's abstracted endpoint on the endpoint abstraction connected to the user's communication system, the user can continue to use his abstracted endpoint, e.g. in his GSM phone, while benefitting from the services, applications and features available in his preferred communication system, e.g. the enterprise PABX. Incoming and outgoing communication will be controlled as if originating from or terminated at an endpoint in the communication system, e.g. the user's fixed phone, while the user continues to use his preferred device, e.g. his cell phone, and consequently also continues to enjoy location based services available by his preferred device. Presence of the user in the communication system is a benefit of the compliance of the endpoint abstraction—user's communication system protocol linked with the endpoint abstraction second identity, e.g. his SIP username/password if the system is a SIP IP PBX.

Whereas the identity of the abstracted endpoint in the abstracted network is called the first identity throughout this patent application, the identity in the (private or not) user's communication system is called the device's second identity throughout this patent application. This first identity and second identity are one-to-one linked by pre-registration in the network abstraction gateway. For outbound calls, i.e. calls or communication sessions originating from the abstracted endpoint, the calling party identification shall correspond to the first identity, i.e. the identity in the abstracted network. For inbound calls, i.e. calls or communication sessions terminated at the abstracted endpoint, the called party identification shall correspond to the user's first identity in the abstracted network. The communication sessions shall be transferred to the endpoint abstraction as a result of which the user shall expose behavior and eventually also presence on the user's communication system while terminating bi-directional communication sessions on his abstracted endpoint in the abstracted network.

The NAG according to the current invention can be installed in the abstracted network, in the (private) system or in between both, and does not require any adaptations, protocol or software upgrades on the abstracted endpoints, or on the physical devices that host the abstracted endpoints. The NAG does not need to integrate routing and/or location registration functionality. It only maintains a list of users that login/logoff for the service, and it abstracts the corresponding endpoints logged in for the service on the user's communication system thereby using a dedicated protocol known to the user's communication system, e.g. Session Initiation Protocol (SIP). Login for the NAG service may be preconfigured or may happen on explicit request from the user, depending on the implementation.

Advantageously, the NAG shall be located in the public, abstracted network to enable the operator to use public attributes, e.g. the caller ID of end users, in a lawful manner. If the user has a fixed caller ID and a mobile caller ID, the NAG can choose to set the fixed or mobile caller ID in a scalable manner. In comparison, if the NAG would be located in the user's communication system, caller ID manipulation could only be experienced through specific additional services, e.g. a dedicated line from the user's company to the mobile operator, and specific configuration of the PBX.

Thanks to the current invention, location based services, e.g. based on the GSM base station where the abstracted endpoint is connected to, can continue to be used.

It is further noticed that the term "communication sessions" used throughout this patent application not only covers inbound/outbound telephone calls to the abstracted endpoint, but also entails instant messaging like SMS or MMS messaging, video sessions, internet sessions, multi-party conference calls, etc.

Optionally, in the network abstraction gateway according to the current invention the means for extracting behavior of the abstracted endpoint may comprise:
  means for receiving communication sessions originating from or destined to the abstracted endpoint via forced routing implemented in the abstracted network; and
  means for analyzing said communication sessions in order to extract at least the first identity thereof.

Thus, in order to extract the abstracted endpoint's behavior, all inbound/outbound communication sessions to the abstract endpoint abstraction preferably are forced routed to the NAG. The forced routing shall route all traffic to and from the abstracted endpoint towards the NAG and can be implemented in the abstracted network through existing mechanisms. For scalability reasons, it may however be desirable not to force all traffic to pass through the NAG, but alternatively to rely on the signaling, part of the signaling or even a copy thereof as will be explained below.

The component in the NAG that receives all traffic via forced routing shall analyze the traffic in order to establish the identity of the abstracted endpoint in the abstracted network, i.e. the first identity. The NAG shall use this first identity to map behavior of the abstracted endpoint in the abstracted network onto corresponding behavior in the user's communication system. The NAG thereto detects the identity of the abstracted endpoint in the abstracted network and maps the communication features and states of that abstracted endpoint to a uniquely linked identity of the corresponding endpoint abstraction in the user's communication system.

Forced routing to the network abstraction gateway according to the present invention may be implemented through:
  switch configuration in the abstracted network and intelligent network or IN based forced routing;
  calling card usage with two-stage dialing;
  calling card usage with call back mechanism and two-stage dialing; or
  an application in a SIM card that implements the forced routing.

Indeed the forced routing may be implemented in the abstracted network through different existing mechanisms.

A first mechanism consists in network based forced routing. When the user initiates a call from his abstracted endpoint, one of the switches that processes the call in the abstracted network may be pre-configured to activate an intelligent trigger that triggers the logic of an Intelligent Network Service Control Point (IN SCP) to send a connect message back to the switch instructing the switch to route the call via a prefix that indicates how to reach the NAG according to the present invention.

A second mechanism consists in using a standard calling card client that implements two-stage dialing in the abstracted endpoint. When the user dials a destination number from his abstracted endpoint, software in the user's terminal shall intercept the call, call a specific Direct Dial-In (DDI), i.e. a number associated with a dedicated trunk line to the user's PBX or gateway, provide Direct Inward System Access (DISA), and dial the initially called number through DTMF.

A third mechanism relies on usage of a calling card and a callback mechanism. When the user dials a destination number from his abstracted endpoint, software in the user's terminal shall intercept the call, call a specific Direct Dial-In (DDI) that is busy and wait. The DDI call back mechanism shall call back the terminal and provide Direct Inward System Access (DISA) to dial the initially called number through DTMF.

A fourth implementation may rely on a program or application in a GSM SIM Java card that implements the forced routing.

Alternatively to forced routing, the means for extracting behavior of the abstracted endpoint may comprise:
  means for monitoring at least part of the signaling of communication sessions originating from or destined to the abstracted endpoint.

Indeed, the component in the NAG that extracts the abstracted endpoint's behavior may be monitoring the signaling (and media) or part of the signaling (and media) related to traffic generated by or destined to the abstracted endpoint. In order to do this, the signaling or a copy of the signaling related to all communication sessions, both inbound and outbound, must be routed to an abstracted network ingress interface of the NAG, thereby preserving certain session attributes like the calling party identification and called party identification. The NAG shall then analyze the signaling in order to establish the identity of the user in the abstracted network, i.e. the first identity. The NAG shall use this first identity to map behavior of the abstracted endpoint in the abstracted network onto corresponding behavior in the user's communication system.

Although not limited thereto, preferred examples of PBX or application server features that may be moved to the endpoint abstraction in a network abstraction gateway according to the present invention are:
  directory services;
  a busy lamp feature;
    attended transfer service;
    instant messaging;
    caller name passing to the abstracted endpoint;
    a video service;
    voicemail notification;
    privacy management;
    302 move temporary from said user's communication system;
    302 move temporary from said network abstraction gateway (NAG);
    auto-provisioning of said network abstraction gateway (NAG);
    call rejection;
    ad-hoc conferencing;
    voice continuity service between a WiFi SIP endpoint and GSM endpoint on a smartphone;
    unification of a fixed and mobile phone as a single endpoint abstraction;
    call recording;
    call restriction management;
    call privacy management;
    call reporting;
    callback on busy and/or callback on no reply;
    mobile endpoint line supervision by a fixed telephone;
    fixed and mobile call forking;
    single number reach; and
    single voicemail.

Thus, the network abstraction gateway according to the current invention enables the user to enjoy features and states of his PBX on his mobile phone. PBX service in other words is extended to the mobile world. Certain information maintained in the PBX databases therefore must be made accessible for exploitation by the network abstraction gateway. These features generally can be categorized in three different categories: a first category of features that require an IP phone abstraction IP/PBX protocol interpretation in the NAG; a second category of communication features that can be implemented in the NAG instead of in the IP/PBX hence reducing the implementation complexity in the IP/PBX; and a third category of IP/PBX features which are available on any mobile endpoint because the NAG interprets all calls placed by a mobile endpoint as calls made by the endpoint abstraction and all calls received by a mobile endpoint as an IP/PBX call which rings the endpoint abstraction. A non-exhaustive list of example features in these three different categories is given in the following paragraphs.

Examples of the first category of features that require an IP phone abstraction IP/PBX protocol interpretation in the NAG:

the directory service: for example, the IP/PBX offers an LDAP (Lightweight Directory Access Protocol) directory which can be accessed by the IP phone abstraction, consolidated in a NAG database and synchronized through SYNCML (Synchronization Markup Language) on most GSM handsets;

the busy lamp feature: for example, the IP/PBX offers a SIP (Session Initiation Protocol) subscribe feature to the state of other phones which can be accessed by the IP phone abstraction and rendered on the mobile or any web browser via a web page hosted on the NAG;

the attended transfer service: for example, when the NAG's IP phone abstraction has two IP/PBX simultaneous conversations, pressing the "*" button on the GSM handset can be detected by the NAG and interpreted as the order to transfer the first called party to the second called party via a SIP refer mechanism implemented by the IP/PBX;

instant messaging: for example, when the NAG's IP phone abstraction receives a SIP MESSAGE message, he can forward the message via SMS to the GSM handset; on the other hand, when the NAG detects that the GSM network receives an SMS for an IP/PBX user, he can send a SIP MESSAGE message using the IP/PBX SIP implementation;

caller name passing: typically, the IP/PBX will send the name of the calling party to the IP phone abstraction through a SIP INVITE message; this caller name can be passed to the GSM handset either via a push of a web page to the mobile phone or through Text-To-Speech technology;

video: if the IP phone abstraction hosted by the NAG receives a re-invite with a video codec capability, the NAG can send via email a URL which, when selected, connects the web browser (on the mobile or on any other machine) to a NAG service which translates the video coming from/sending to the IP/PBX as an RTMP (Real Time Messaging Protocol) stream in a flash player for example;

the voicemail notification: for example, when the NAG's IP phone abstraction receives a NOTIFY message indicating there is a voice message waiting, the NAG can interpret this and sends an SMS to the mobile phone to notify there is a new voicemail waiting;

privacy management: the NAG can interpret a specific access code as an order to place a private call on the IP/PBX;

302 move temporary from the IP/PBX: the NAG, when placing a call to the IP/PBX, can receive a 302 move temporary and implement this SIP feature to re-connect to a temporary destination;

302 move temporary from the NAG: the NAG can detects that a GSM handset is configured to redirect the call to a specific destination either by querying the mobile network, or because the forced routing implemented in the IN (Intelligent Network) generates a call to the NAG with a specific redirection header; in any case, the NAG can interpret this and generate a 302 move temporary to the IP/PBX to connect the calling party with the specific destination;

auto-provisioning of the NAG: often an IP/PBX provides automatic provisioning service to configure an IP phones having a specific MAC address IP/PBX registrar, SIP credentials, Call-Forward configurations, etc.; by replacing the MAC address with a mobile number which must be provisioned, this provisioning protocol can be re-used by the NAG in order to configure the behavior of the GSM on the GSM network for a specific mobile number;

GSM call rejection: when the endpoint abstraction "rings" and the GSM user rejects the call, the mobile network can send a message to the NAG so that the NAG redirects the IP/PBX call to a specific destination, e.g. the voicemail, a secretary, etc.

Examples of the second category of communication features that can be implemented in the NAG instead of in the IP/PBX hence reducing the implementation complexity in the IP/PBX:

ad-hoc conference: when the NAG IP phone abstraction has several IP/PBX simultaneous calls, pressing the "#" button on any conversation can trigger a conference bridge to bridge transparently all IP/PBX conversations and the GSM conversations;

voice continuity service between a WIFI SIP connectivity and a GSM connectivity on a smartphone: the NAG implements an additional SIP peer enabling a smartphone to connect with the NAG via a SIP WIFI endpoint; when the NAG detects that a good quality is available with this WIFI SIP endpoint, he can stop the GSM communication and smoothly switch with a new WIFI SIP endpoint conversation;

unification of a fixed and mobile phone as a single endpoint abstraction and support of plug-and-play configuration of third party IP phone on a given IP/PBX: the NAG implements the auto-provisioning of a specific IP phone so that this fix IP phone registers to the NAG; when receiving a call for the endpoint abstraction, the NAG calls the mobile and the fix IP phone, when making a call from either the GSM or the IP phone, the NAG places the call through the endpoint abstraction on the IP/PBX;

call recording: the NAG can record all calls placed and received by an endpoint abstraction connected to the IP/PBX.

Examples of the third category of IP/PBX features which are available on any mobile endpoint because the NAG interprets all calls placed by a mobile endpoint as calls made by the endpoint abstraction and all calls received by a mobile endpoint as an IP/PBX call which rings the endpoint abstraction are:

call restriction management: the IP/PBX administrator can block certain destination for a specific GSM by using the IP/PBX management interface;

call privacy management: the IP/PBX administrator can block the CLI (Calling Line Identification) for specific GSM calls by using the IP/PBX management interface either by configuring a specific access code, or by forcing the privacy for the endpoint abstraction in the IP/PBX configuration;

GSM call reporting: the IP/PBX administrator can use his standard reporting tool in order to monitor the activity of a specific GSM handset;

callback on busy, callback on no reply: as the IP/PBX knows if the GSM phone is busy or idle, the callback on busy and callback on no reply of a the IP/PBX can work when calling an endpoint abstraction;

GSM line supervision by a fix phone: the IP/PBX knows if the endpoint abstraction is busy or idle so that another endpoint can subscribe to the status of the endpoint abstraction;

fix and mobile call forking: the IP/PBX can be configured to ring the NAG endpoint abstraction and the fix IP phone of the user when the user's extension is dialed;

single number reach: the IP/PBX can have a single DDI (Direct Dial-In) which can be mapped to the NAG endpoint abstraction and the fix IP phone;

single voicemail: the IP/PBX voicemail becomes the single voicemail for the endpoint abstraction and fix phone of the user.

The abstracted endpoint that will be abstracted using a network abstraction gateway according to the present invention can be:
- a Global System for Mobile communications or GSM client;
- a Session Initiation Protocol or SIP WiFi phone client;
- a softphone client;
- an analogue phone client;
- a Digital Enhanced Cordless Telecommunications or DECT phone client;
- an Internet Protocol—Digital Enhanced Cordless Telecommunications or IP-DECT phone client;
- a WiFi - Session Initiation Protocol or WiFi-SIP phone client;
- an Internet Protocol or IP phone client;
- a satellite phone client;
- a proprietary Time-Division Multiplexing or TDM phone client;
- an instant messaging client; or
- a Bluetooth headset or car kit device client.

Application of the present invention however is not limited thereto. Since the present invention can be implemented without adaptation of the abstracted endpoint, basically any existing or future communication session client integrated in a mobile handset or fixed terminal will be able to benefit from the invention.

The user's communication system whereon the endpoint will be emulated by the network abstraction gateway according to the present invention can be:
- an application server;
- a Private Branch eXchange or PBX;
- an Internet Protocol Centrex or IP Centrex;
- an Interactive Voice Response or IVR;
- a web-based Voice over Internet Protocol or VoIP application;
- a Global system for Mobile communications or GSM network; or
- a critical environment network; or
- a network formed by an available Bluetooth handset or headset and car kit devices reachable by said network abstraction gateway (NAG).

Again, this list is exemplary and not exhaustive. Since the current invention does not require adaptation of the user's communication system, basically any system that exposes behavior of an endpoint through an identity and protocol that can be shared with the NAG, can benefit from the invention. Examples of critical environment networks are networks deployed in space, mines, oceans, etc.

Optionally, the dedicated protocol supported by the user's communication system may be:
- the Session Initiation Protocol or SIP;
- the eXtensible Messaging and Presence Protocol or XMPP;
- the Skype protocol;
- the Time-Division Multiplexing or TDM protocol;
- a proprietary Time-Division Multiplexing or TDM protocol; or
- the Bluetooth protocol.

In situations where the user desires to expose behavior from/presence within an IP PBX, IP Centrex or VoIP application as if the user places and receives calls from his standard IP phone or PC, the network abstraction gateway according to the invention typically shall perform SIP endpoint abstraction and initiate SIP sessions on behalf of the user, using his/her SIP identity in the IP PBX, IP Centrex or VoIP platform. Other protocols whereon the abstracted endpoint's behavior can be mapped, may be used as well. Again, the above list is non-exhaustive.

According to another optional aspect, the network abstraction gateway according to the present invention may comprise:
means adapted to automatically unregister the endpoint abstraction as soon as no regular location updates are received from the abstracted endpoint.

In particular when forced routing towards the NAG is implemented in the abstracted network, the latter will continue to forward incoming calls, even when the physical terminal wherein the abstracted endpoint resides, e.g. the user's mobile phone, is switched off. By verifying if location updates are received from the abstracted endpoint and automatically unregistering from the network abstraction service when no regular location updates are received, it is avoided that incoming calls remain forwarded to the switched-off terminal.

According to yet another optional aspect, the network abstraction gateway according to the invention may comprise:
text-to-speech conversion means.

Thus, the network abstraction gateway may be supplemented with a text-to-speech conversion function, in order to pass for example caller name information, instant messages, etc. to the abstracted endpoint.

In addition to a network abstraction gateway, the present invention also relates to a method to abstract an abstracted endpoint of a user, the abstracted endpoint having a first identity in an abstracted network, the method comprising the steps of:
installing a network abstraction gateway with connectivity to the abstracted network via an abstracted network interface and connectivity to a user's communication system via a communication system interface;
registering in the network abstraction gateway a one-to-one relationship between the first identity and a second identity in the user's communication system;

abstracting the abstracted endpoint in the user's communication system via an endpoint abstraction using the second identity;

extracting behavior of the abstracted endpoint, comprising communication features and/or states of the abstracted endpoint;

implementing at least one feature and/or state of the user's communication system; and bi-directionally mapping the behavior of the abstracted endpoint with features and/or states of the user's communication system via a protocol supported by the user's communication system (CS).

DETAILED DESCRIPTION OF EMBODIMENT(S)

Figure 1:
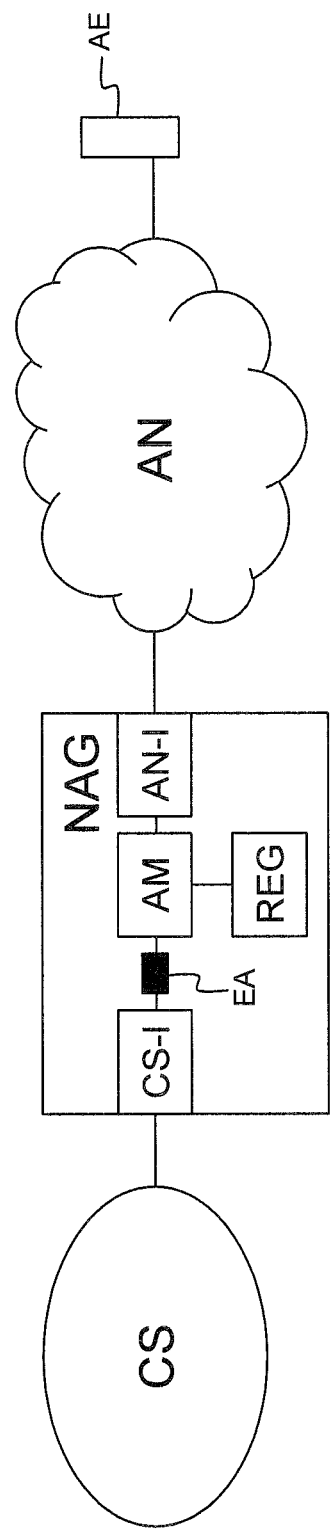
FIG. 1 shows a first embodiment of the network abstraction gateway according to the present invention.

FIG. 1 shows a network abstraction gateway NAG with connectivity to an abstracted network AN and a user's communication system CS. The user under consideration has access to the abstracted network via an abstracted endpoint AE.

The network abstraction gateway NAG has an abstracted network ingress interface and an abstracted network egress interface that are integrated in the abstract network interface AN-I shown in FIG. 1. The network abstraction gateway NAG drawn in FIG. 1 further has an endpoint abstraction SIP user agent EA with SIP connectivity to an endpoint abstraction SIP peer, not shown in FIG. 1 but typically implemented in an application server in the user's communication system CS. This connectivity is realized through the NAG's communication system interface CS-I, i.e. an endpoint abstraction SIP interface with direct or indirect coupling to the user's private network CS. In this private network CS, a physical endpoint SIP peer not drawn in FIG. 1 shall connect with a physical endpoint SIP user agent in the user's endpoint, e.g. his office phone, over a physical endpoint connection.

The network abstraction gateway NAG implements one or more communication servers that provide abstraction of all calls performed on the abstracted network AN passing through the network abstraction gateway NAG. This abstraction emulates one SIP endpoint EA per physical entity on the abstracted network AN such that this SIP endpoint EA can be connected to any SIP application developed by any SIP based PABX.

The goal of the network abstraction gateway NAG is to generate an endpoint abstraction SIP user agent EA by analyzing the traffic generated by the abstracted endpoint AE on the abstracted network AN. In order to be able to do this, the abstracted network AN in FIG. 1 is supposed to implement forced routing: the abstracted network AN routes all the outgoing calls generated by the abstracted endpoint AE to the network abstraction gateway NAG via the abstracted network interface AN-I, thereby preserving call attributes, i.e. information like the calling party identification, the called party identification, etc.

It is noticed that to connect the abstracted network AN to the network abstraction gateway NAG, different technologies can be used like SIP trunks, EuroISDN PRIs, EuroISDN BRIs, SS7, H323, etc.

In the reverse direction, the abstracted network AN must also be able to call the abstracted endpoint AE when the endpoint abstraction SIP user agent EA rings and preserve the call attributes, e.g. caller ID and called ID, as asked by the endpoint abstraction EA. The role of this endpoint abstraction user agent EA is to register a SIP identity in an endpoint abstraction SIP peer in the user's private communication system CS and to simulate the endpoint abstraction SIP connection just like a PEP (Physical EndPoint) SIP user agent would register in a PEP SIP peer of the application server and communicate over a PEP SIP connection. When this is done, every communication with the public network is identical for the endpoint abstraction SIP user agent EA and for a PEP SIP user agent. For example, if a public network gateway would be used, the public network gateway cannot distinguish a call coming from the endpoint abstraction SIP user agent EA from a call coming from a PEP SIP user agent in the user's PABX.

Throughout the following description of embodiments of the invention, the following acronyms and terms will be used:

AN: Abstracted Network
AE: Abstracted Endpoint
AN-I: Abstracted Network ingress Interface
AN-I: Abstracted Network egress Interface
EA: Endpoint Abstraction
EA SIP UA: Endpoint Abstraction SIP User Agent
EA SIP Peer: Endpoint Abstraction SIP Peer
EA SIP Connection: Endpoint Abstraction SIP Connection
PE: Physical Endpoint:
PE SIP Peer: Physical Endpoint SIP Peer
PE SIP UA: Physical Endpoint SIP User Agent
PE SIP Connection: Physical Endpoint SIP Connection
NAG: Network Abstraction Gateway
CS: user's Communication System It is important to notice that the advantage of such a solution resides in that the CS sees all the protocols which implement the features implemented by the the EA SIP UA exactly as the protocols that implement the same features in any other PE SIP UA. As an example, if the user has received or placed two calls on his AE, the EA SIP UA can send a SIP REFER message in order to implement the attended transfer feature if for example the user presses a digit during the second communication on his AE. In another solution, the attended transfer is in fact implemented in the CS. From a user perspective, the EA implementation of the attended transfer is better because the NAG correlates the two calls for the user independently from how these calls are made (through the address book, received, through an SMS, web page, etc.). Typically, in a PABX, the user has to establish a call with his mobile, press a DTMF and receive a dial tone. The user then has to form the number by hand. This is indeed because in fact, in this scenario, there is only a single call from the GSM to the PABX. This example clearly illustrates the benefit of the endpoint abstraction.

A specific important use case of the network abstraction gateway NAG shown in FIG. 1 consists in providing a Fixed Mobile Convergence service for a GSM network. In this scope, the FMC or Fixed Mobile Convergence network service is the ability to register in an IP-PABX a GSM phone as if it was a normal SIP phone. In order to implement this FMC service, all calls made and received by a GSM must be forced routed to the network abstraction gateway NAG. For each number linked to a SIM card, the network abstraction gateway NAG emulates a SIP end point which can be registered in an application server (the PABX or private CS). It is noticed that in the context of the implementation of such a Fixed Mobile Convergence service, the abstracted endpoint AE is the GSM client in the user's GSM phone, and the endpoint abstraction SIP user agent EA is the SIP user agent which emulates the GSM phone's behavior on the IP-PABX.

Figure 2:
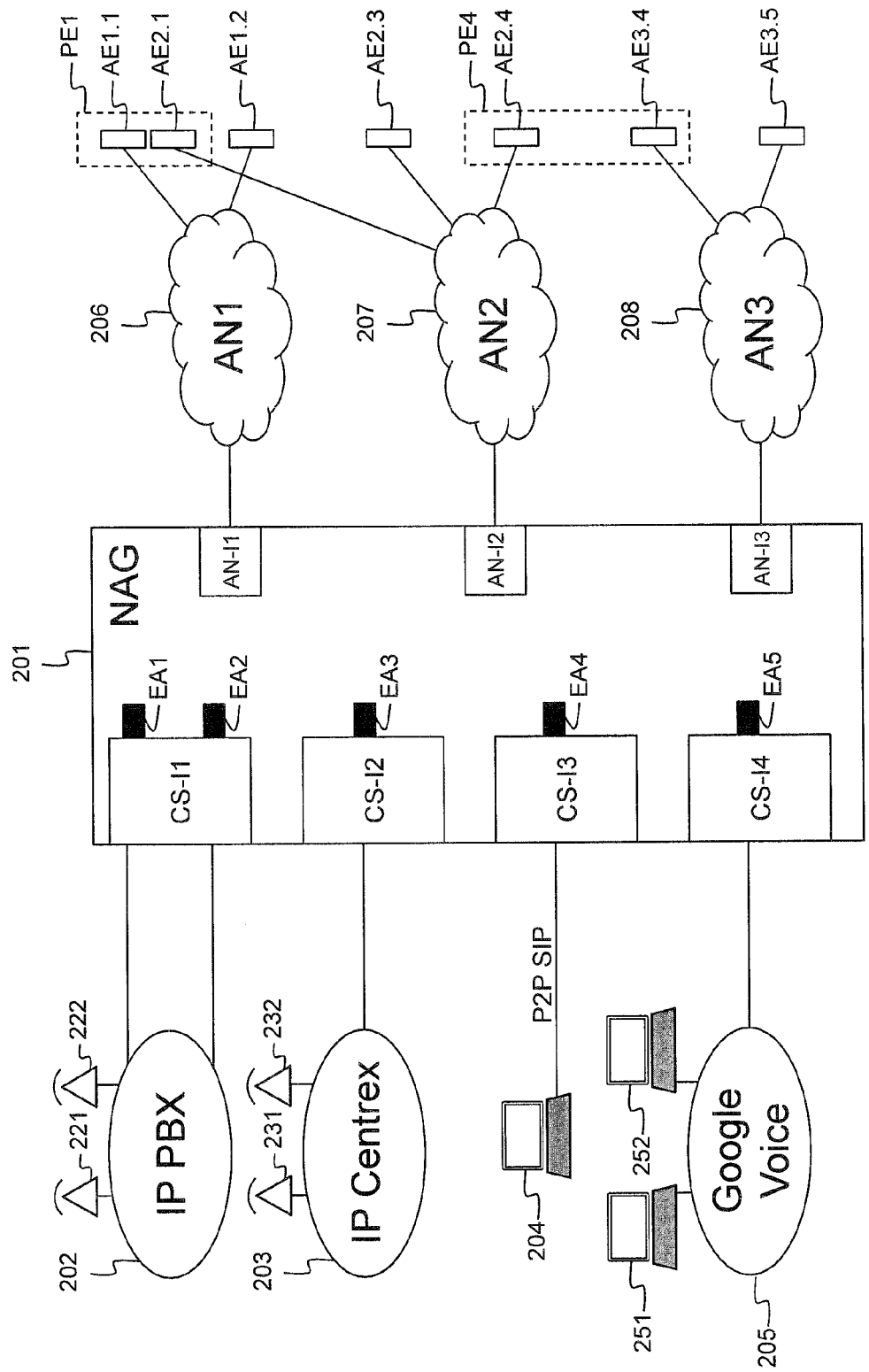
FIG. 2 shows a second embodiment of the network abstraction gateway according to the present invention, with connectivity to plural abstracted networks and plural user communications systems.

FIG. 2 illustrates an embodiment 201 of the network abstraction gateway NAG with connectivity to plural user communication systems, i.e. IP PBX 202, IP Centrex 203, point-to-point SIP connection to a user's PC 204, and Google Voice 205, and with connectivity to plural abstracted networks, i.e. abstracted networks AN1 or 206, AN2 or 207, and AN3 or 208. The NAG 201 hence is provided with plural user communication system interfaces CS-I1, CS-I2, CS-I3 and CS-I4 for connectivity with respectively IP PBX 202, IP Centrex 203, point-to-point SIP connection to a user's PC 204, and Google Voice 205. The NAG 201 further is provided with abstracted network ingress/egress interfaces AN-I1, AN-I2 and AN-I3 for the respective connections to abstracted networks 206, 207 and 208.

FIG. 2 further illustrates that a physical end point, e.g. a mobile handset like PE1 or PE4 can connect to several abstracted networks via several abstracted endpoints. Typically, a single physical endpoint shall contain several virtual endpoints, each representing abstracted endpoints that connect to different abstracted networks. A physical mobile handset like PE1 for instance contains a GSM client AE1.1, an SMS client AE2.1, etc. The physical endpoint PE1 hence is connected to several abstracted networks: the GSM client AE1.1 connects to a GSM network AN1, the SMS client AE2.1 connects to an SMS network AN2, etc. In general, a physical endpoint referenced by PEy contains several abstracted endpoints denoted by AEx.y, where x is referring to the abstracted network and y is referring to the physical endpoint.

As an example, physical endpoint PE1 in FIG. 2 is a mobile handset connected to GSM abstracted network 206 and SMS abstracted network 207 via respectively the GSM client AE1.1 and SMS client AE2.1. When the mobile handset PE1 emits a GSM call, this calling behavior is then mapped to a SIP call by NAG 201 via the endpoint abstraction EA1 in IP PBX 202 where the user of handset PE1 is having his office IP phone 221. When the mobile handset PE1 sends an SMS message, this texting behavior is mapped to a SIP IM message being sent via the same endpoint abstraction EA1 in IP PBX 202. In summary, the behavior of several virtual abstracted endpoints residing in the same physical endpoint is mapped or unified into multiple behaviors on a single SIP endpoint abstraction.

FIG. 2 further shows abstracted endpoint AE1.2 that forms part of a second physical terminal, not explicitly drawn in FIG. 2. This second terminal belongs to a second user with a second identity in IP PBX 202 represented in FIG. 2 by the IP phone 222. The NAG 201 hence maps the behavior of abstracted endpoint AE2.1 onto corresponding SIP calling behavior of an endpoint abstraction EA2 that interfaces with IP PBX 202 via the communication system interface CS-I1. A third physical endpoint, not explicitly drawn in FIG. 2, hosts an SMS client AE2.3 that connects with the abstracted SMS network 207. The messaging behavior of AE2.3 is mapped onto endpoint abstraction EA3 in the IP Centrex 203 where the user of the third physical endpoint is supposed to have a second identity that is used from his IP phone 231. A fourth physical endpoint PE4 again hosts two virtual abstracted endpoints: on the one hand, abstracted endpoint AE2.4 represents an SMS client with connectivity to SMS network 207, on the other hand abstracted endpoint AE3.4 represents a WiFi SIP phone client with connectivity to WiFi-SIP network AN3. The messaging behavior and calling behavior of PE4 will be mapped by NAG 201 onto corresponding behavior of an endpoint abstraction EA4 with point-to-point SIP connectivity to the fourth user's PC 204. At last, FIG. 2 shows an abstracted endpoint EA3.5 residing in a fifth physical endpoint not drawn in FIG. 2, and connecting with WiFi-SIP abstracted network 208. The fifth physical endpoint belongs to a user with Google Voice subscription that is used from the fifth user's PC 251 for calls. The NAG 201 shall therefore abstract the calling behavior of AE3.5 into corresponding behavior of an endpoint abstraction EA5 with connectivity to Google Voice 205.

Figure 3:
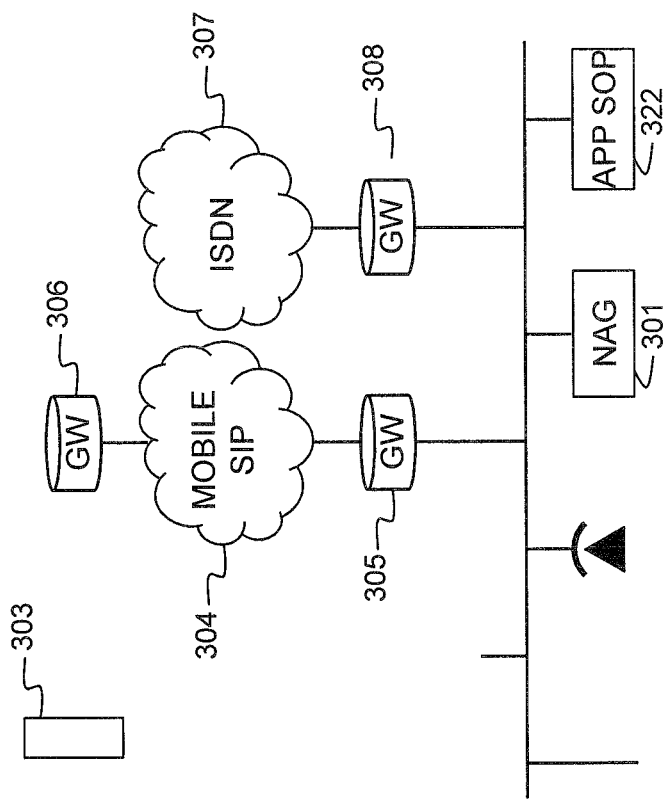
FIG. 3 illustrates a customer dedicated embodiment of the network abstraction gateway according to the present invention.
Figure 4:
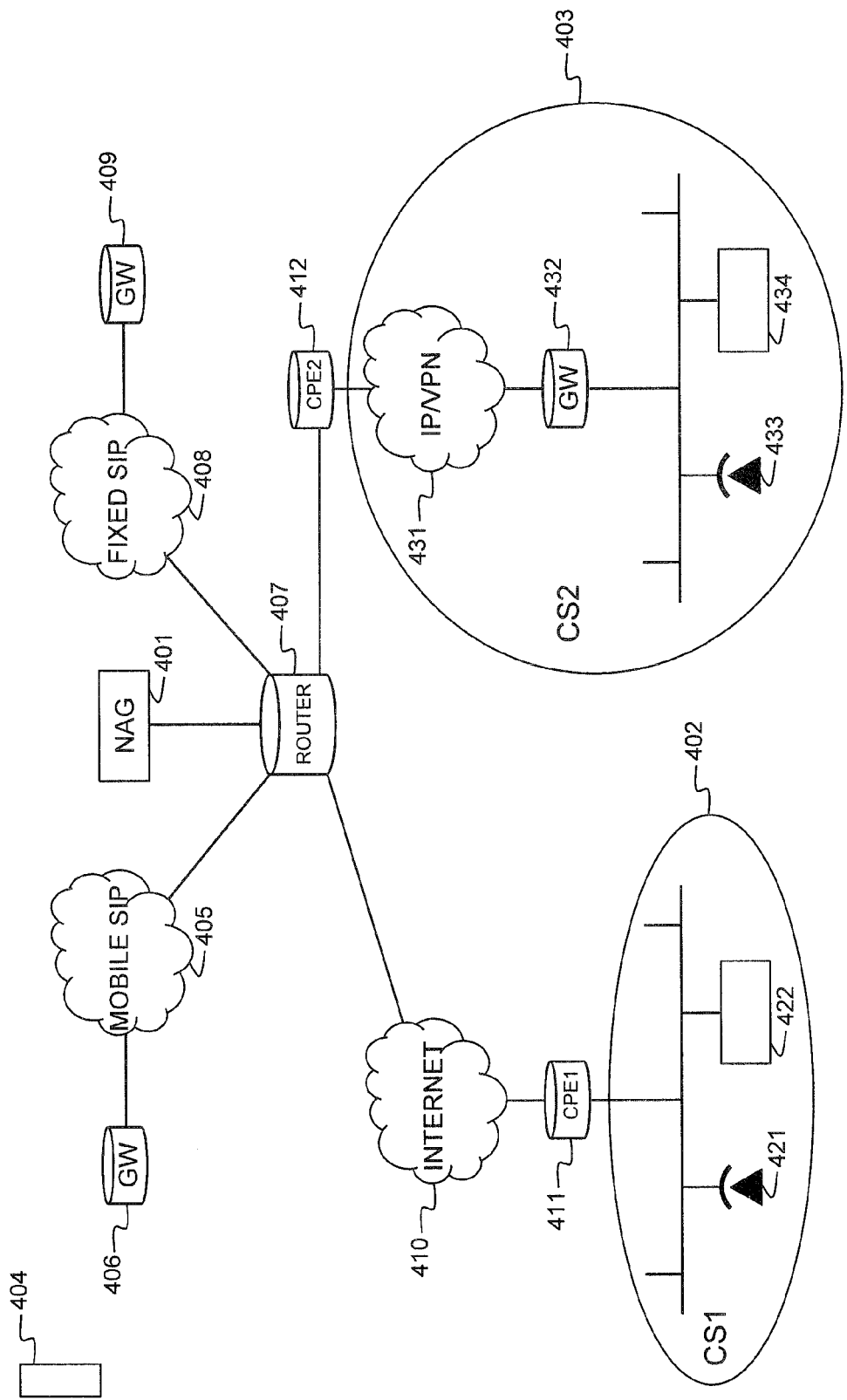
FIG. 4 illustrates a shared embodiment of the network abstraction gateway according to the present invention.

As is illustrated by FIG. 3 and FIG. 4, the network abstraction gateway according to the current invention can be deployed on different topology.

FIG. 3 shows a customer dedicated NAG 301, i.e. a NAG that is installed physically at a customer site, for instance at a site of the company that owns the user's communication system and desires to have the network abstraction gateway service implemented for its users. An advantage thereof is that the customer can implement his own Service Level Agreement (SLA) and can customize the NAG behavior.

The customer dedicated NAG 301 drawn in FIG. 3 has connectivity to a mobile SIP abstracted network 304 via a dedicated gateway 305, and connectivity to an ISDN network 307 via another dedicated gateway 308 with Primary Rate Interface (PRI). The user has access to the mobile SIP network 304 via its mobile handset 303 and gateway 306. Further, an application server 322, corresponding to the user's communication system, with re-invite facility enabled, is shown in FIG. 3. In a specific use case, a call originating from mobile handset 303 on the abstracted mobile SIP network 304 is mapped onto a corresponding ISDN call by the customer dedicated NAG 301.

It is noticed that for redundancy purposes, two NAGs may be installed in two distinct customer physical sites. In the hypothesis that the SIP trunk service provider can implement hunting on SIP trunks connected to the two NAGs, these two NAGs can run in an unbalanced active/active mode.

Alternatively, a customer dedicated NAG may be hosted, i.e. a NAG is installed per customer physically in a service provider datacenter. Whereas the customer can still implement his own Service Level Agreement (SLA) and customize the NAG behavior, the IP/VPN bandwidth usage can be optimized through hosting.

In the latter implementation, redundancy may be provided by installing two NAGs per customer physically in two distinct service provider datacenters.

FIG. 4 shows a shared NAG implementation: a NAG 401 that is shared by multiple customers is hosted in a service provider datacenter. Depending on the capacity of the service provider, different phases can be implemented to provide the shared NAG service.

It is noticed that in the shared NAG implementation, redundancy can be provided by installing two or more NAGs in at least two distinct service provider datacenters.

To further illustrate the different topologies to implement a shared NAG, the Fixed Mobile Convergence (FMC) service is used. In this context, the NAG may also be called "Mobile Access Gateway" or MAG.

Figure 5:
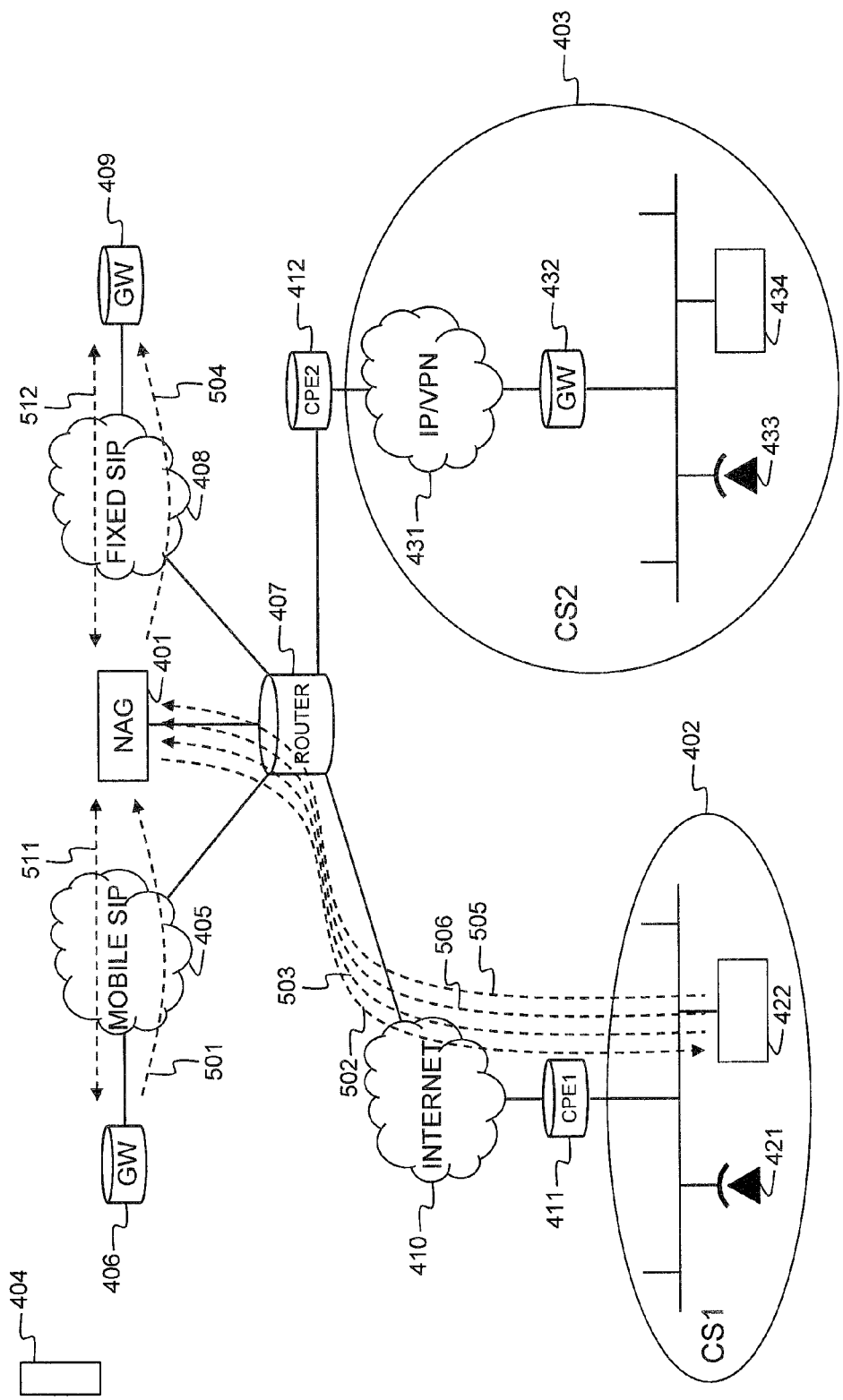
FIG. 5 illustrates a first use case of the shared network abstraction gateway of FIG. 4 in a scenario where a call is setup from a mobile handset to an external phone.
Figure 6:
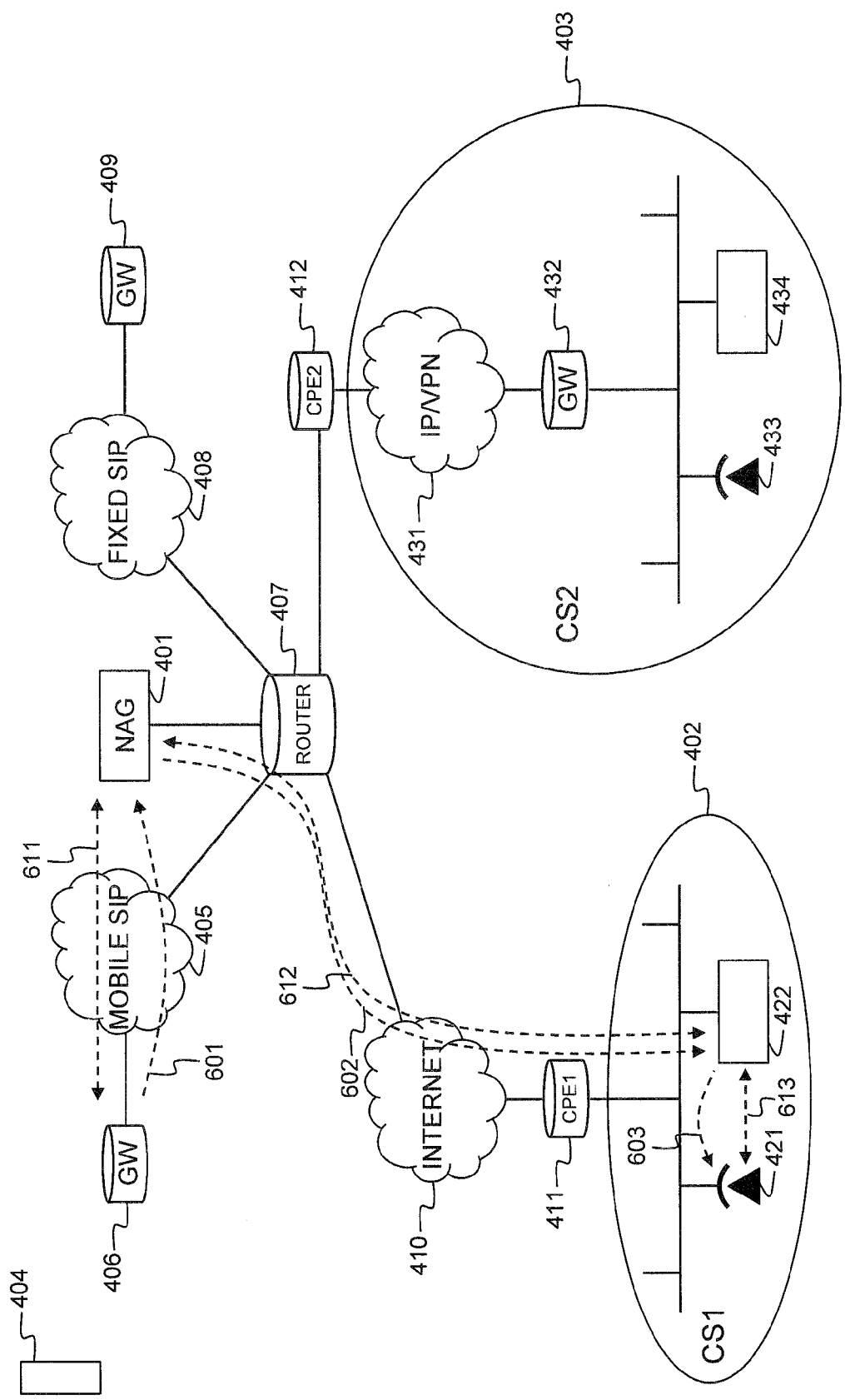
FIG. 6 illustrates a second use case of the shared network abstraction gateway of FIG. 4 in a scenario where a call is setup from a mobile handset to an internal phone.

FIG. 4, FIG. 5 and FIG. 6 depict the configuration of two customers that share the network abstraction gateway 401. These customers are connected to the NAG 401 through an IP/VPN 431 dedicated to the second customer or simply through the Internet 410 in case of the first customer. The IP/VPN 431 of the second customer is connected to the NAG's public IP address through the CPE2 router 412. The LAN 402 of the first customer is connected to the NAG's public IP address through the CPE1 router 411. The NAG's public IP address is connected to the different CPEs 411 and 412, the mobile VoIP gateway 406 and the fixed VoIP gateway 409 via a router 407 and respective mobile SIP and fixed SIP networks 405 and 408. The drawings further show the mobile handset 404 of a user that will be supposed to make a call to an external phone in FIG. 5 and will be supposed to make a call to an internal phone in FIG. 6.

In FIG. 5, mobile phone 404 emits a call to an external destination. With the forced routing activated in the mobile network, the signaling is sent to gateway 406. As a result, gateway 406 sends a SIP invite message 501 to the NAG 401. At his turn the NAG sends a SIP invite message 502 to PBX 422 in the customer's communication system 402. The customer's communication system locates the external destination as being located behind gateway 409 which it can reach via the NAG 401. Therefor the customer's communication system 422 sends, at his turn, an invite message 503 to the NAG 401 and the NAG sends an invite message 504 to the gateway 409. Once the external phone behind the gateway 409 accepts the call, the customer's communication system 402 is only used to bridge the call coming from the NAG 401 back to the NAG 401. This is not efficient since this consumes resources on the customer's internet or VPN connection. Therefor the customer's communication system 402 will ask the NAG 401 to get out of the loop. It does this by sending two re-invite requests 505 and 506, one for each SIP call 502 and 503. As a result the bidirectional RTP media stream 511, 512 follows the shortest possible route between the mobile phone 404 and the external destination behind gateway 409.

In FIG. 6, mobile phone 404 emits a call to an internal destination 421. Here the call setup is much more straightforward. Mobile phone 404 emits a call. With the forced routing activated in the mobile network, the signaling is sent to gateway 406. As a result, gateway 406 sends a SIP invite message 601 to the NAG 401. At his turn the NAG 401 sends a SIP invite message 602 to PBX 422 in the customer's communication system 402. The customer's communication system 402 locates the destination 421 as being located inside the same LAN network and sends, at his turn, an invite message 603 to the destination phone 421. Once the internal phone 421 accepts the call, the bidirectional RTP media stream is established and follows the route 611, 612 and 613.

In another embodiment, that can be described with reference to the architecture of FIG. 1, the user may want to expose his GSM identity, e.g. his GSM caller ID, and GSM services, while the user benefits from the convenience of a fixed phone, for instance the conference room phone connected to a SIP IP PABX. With reference to FIG. 1, the communication system CS in this embodiment of the invention corresponds to the user's Bluetooth enabled GSM handset connected to the GSM provider. The abstracted network AN is the just mentioned SIP IP PABX. The abstracted endpoint AE is a conference room phone, and the endpoint abstraction EA is a Bluetooth interface similar to the interface of a Bluetooth car kit, implemented in the network abstraction gateway NAG.

The NAG is connected to the PABX (AN) as a SIP identity. An IVR (Interactive Voice Responder) implemented on the PABX requests the Bluetooth pincode of the user's GSM handset in order to pair the EA interface CS-I and the mobile handset. When calling this IVR for example through the conference phone, the PABX routes all calls made by the conference room phone to the NAG implementing forced routing. When receiving such a call, the NAG composes on the EA Bluetooth interface the requested number and transforms the Bluetooth signal into a SIP signal. Alternatively, when the EA Bluetooth NAG interface detects that the GSM handset is ringing, the NAG calls the conference room phone number through SIP. The result is that the user just by leaving his GSM phone next to a NAG Bluetooth interface can conveniently use his GSM identity transparently via the conference room phone or any other phone connected on the PABX.

Through yet another embodiment of the current invention, mobility services can be added to an IP PABX which does not provide mobility. In this embodiment, the user's communication system CS is a SIP IP PABX which does not implement fixed phone mobility. A first abstracted network AN1 is a SIP network interconnecting SIP phones to the NAG. A second abstracted network AN2 is a GSM network interconnecting the user's GSM phone to the NAG through the forced routing as already described above. AE1.1, AE1.2, ... are SIP phones for which the mobility service must be enabled. AE2.3 is the user's GSM handset connected on abstracted network AN2. The endpoint abstraction EA is a SIP identity registered in the CS, i.e. the SIP IP PABX. A provisioning network of these SIP phones enables the NAG to configure these SIP phones (label on the phone, speed dial, etc.) based on the user profile stored in the NAG.

The NAG provides a login user interface, for example an IVR, which enables the user to map the EA SIP identity of the user exposed on the CS to the physical phone used for the login. At the same time, as an option, the NAG can also use the provisioning network to configure the physical SIP phone used with the user profile parameters (label, speed dial, etc.). By doing so, all actions (call, transfer, ... ) made by any logged phone for the user identity generate similar actions on the EA SIP identity and all calls received on the EA SIP identity are forked on all the physical SIP phones where the user is logged. A logout user interface, for example an IVR, enables the user to remove the association between the physical phone and the given EA SIP identity, and optionally un-configures the physical end point. Similarly, the GSM AE2 can use the same login/logout procedure to add/remove the GSM phone to the EA SIP identity.

Yet another embodiment illustrates usage of the invention in a non-GSM environment. Herein, the NAG is for instance again connected to 2 abstracted networks. The first abstracted network is formed by the Bluetooth coverage around the NAG. The abstracted endpoints connected to this first abstracted network are Bluetooth headsets. The second abstracted network is formed by an IM (instant messaging) network, for example implemented by an XMPP (eXtensible Messaging and Presence Protocol) server. Here, the abstracted endpoints are XMPP clients. The NAG is further connected to a SIP IP PBX, i.e. the user's communication system CS in the terminology of the current patent application.

In order to provide the SIP AE, the NAG multiplexes the two abstracted end point behaviors by for example:
  interpreting chat messages sent by the XMPP client like 'dial', 'call' as SIP session initiation (INVITE);

interpreting chat messages sent by the XMPP client like 'transfer', 'redirect' as SIP session redirection (REFER);

routing voice calls from the RTP stack to/from the Bluetooth headset.

detecting availability through the Bluetooth headset detection (simulated by a REGISTER SIP message); and closing and receiving calls by the usage of the Bluetooth headset.

It is at last remarked that the current invention may multiplex different abstracted endpoints. A specific application could for instance be the multiplexing of a GSM client and a SIP client which provides video in order to provide to the CS an AE which is a voice/video client using the video on the desktop and the GSM for the voice.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A network abstraction gateway (NAG) comprising:
at least one abstracted network interface (AN-I) for connectivity with at least one abstracted network (AN) wherein a user has an abstracted endpoint (AE) having a first identity in said abstracted network (AN); at least one communication system interface (CS-I) for connectivity with at least one user's communication system (CS), said communication system interface (CS-I) exposing abstracted endpoint behavior via a second identity in said user's communication system (CS); means (REG) adapted for registering a one-to-one relationship between said first identity and said second identity;means for extracting behavior of said abstracted endpoint (AE), comprising communication features and/or states of said abstracted endpoint (AE); and endpoint abstraction means (AM) adapted for abstracting said abstracted endpoint (AE) in said user's communication system (CS) via an endpoint abstraction (EA) using said second identity, said endpoint abstraction (EA) being responsive to behavior of said abstracted endpoint (AE), being adapted to implement at least one feature and/or state of said user's communication system (CS), and being adapted to bi-directionally map said behavior of said abstracted endpoint (AE) with features and/or states of said user's communication system (CS) via a protocol supported by said user's communication system (CS).

2. A network abstraction gateway (NAG) according to claim 1, said means for extracting behavior of said abstracted endpoint (AE) further comprising:
means for receiving communication sessions originating from or destined to said abstracted endpoint (AE) via forced routing implemented in said abstracted network (AN); and
means for analyzing said communication sessions in order to extract at least said first identity thereof.

3. A network abstraction gateway (NAG) according to claim 2, wherein said forced routing is implemented through:
switch configuration in said abstracted network and intelligent network or IN based forced routing;
calling card usage with two-stage dialing;
calling card usage with call back mechanism and two-stage dialing; or
an application in a SIM card that implements the forced routing.

4. A network abstraction gateway (NAG) according to claim 1, said means for extracting behavior of said abstracted endpoint (AE) further comprising:
means for monitoring at least part of the signaling of communication sessions originating from or destined to said abstracted endpoint (AE).

5. A network abstraction gateway (NAG) according to claim 1, wherein said at least one feature of said user's communication system comprise one or more of:
directory services;
a busy lamp feature;
attended transfer service; -instant messaging;
caller name passing to said abstracted endpoint (AE);
a video service;
voicemail notification;
privacy management;
302 move temporary from said user's communication system;
302 move temporary from said network abstraction gateway (NAG);
auto-provisioning of said network abstraction gateway (NAG);
call rejection;
ad-hoc conferencing;
voice continuity service between a WiFi SIP endpoint and a GSM endpoint on a smartphone;
unification of a fixed and mobile phone as a single endpoint abstraction;
call recording;
call restriction management;
call privacy management;
call reporting;
callback on busy and/or callback on no reply;
mobile endpoint line supervision by a fixed telephone;
fixed and mobile call forking;
single number reach; and
single voicemail.

6. A network abstraction gateway (NAG) according to claim 1, wherein said abstracted endpoint (AE) is either:
- a Global System for Mobile communications or GSM client;
- a Session Initiation Protocol-WiFi or SIP-WiFi phone client;
- a softphone client;
- an analogue phone client;
- a Digital Enhanced Cordless Telecommunications or DECT phone client;
- an Internet Protocol-Digital Enhanced Cordless Telecommunications or IP-DECT phone client;
- a WiFi-Session Initiation Protocol or WiFi-SIP phone client;
- an Internet Protocol or IP phone client;
- a satellite phone client;
- a proprietary Time-Division Multiplexing or TDM phone client;
- an instant messaging client; or
- a Bluetooth headset or car kit device client.

7. A network abstraction gateway (NAG) according to claim 1, wherein said user's communication system (CS) is either:
- an application server;
- a Private Branch eXchange or PBX;
- an Internet Protocol Centrex or IP Centrex;
- an Interactive Voice Response or IVR;
- a web-based Voice over Internet Protocol or VoIP application;
- a Global System for Mobile communications or GSM network;
- a critical environment network; or
- a network formed by an available Bluetooth handset or headset and car kit devices reachable by said network abstraction gateway (NAG).

8. A network abstraction gateway (NAG) according to claim 1, wherein said protocol supported by said user's communication system (CS) is:
- the Session Initiation Protocol or SIP;
- the eXtensible Messaging and Presence Protocol or XMPP;
- the Skype protocol;
- the Time-Division Multiplexing or TDM protocol;
- a proprietary Time-Division Multiplexing or TDM protocol; or
- the Bluetooth protocol.

9. A network abstraction gateway (NAG) according to claim 1, further comprising: —means adapted for automatically unregistering said endpoint abstraction (EA) as soon as no regular location updates are received from said abstracted endpoint (AE).

10. A network abstraction gateway (NAG) according to claim 1, further comprising text-to-speech conversion means.

11. A method to abstract an abstracted endpoint (AE) of a user, said abstracted endpoint (AE) having a first identity in an abstracted network (AN), said method comprising the steps of:
- installing a network abstraction gateway (NAG) with connectivity to said abstracted network (AN) via an abstracted network interface (AN-I) and connectivity to a user's communication system (CS) via a communication system interface (CS-I);
- registering in said network abstraction gateway (NAG) a one-to-one relationship between said first identity and a second identity in said user's communication system (CS);
- abstracting said abstracted endpoint (AE) in said user's communication system (CS) via an endpoint abstraction (EA) using said second identity;
- extracting behavior of said abstracted endpoint (AE), comprising communication features and/or states of said abstracted endpoint (AE); and
- implementing at least one feature and/or state of said user's communication system (CS); and
- bi-directionally mapping said behavior of said abstracted endpoint (AE) with features and/or states of said user's communication system (CS) via a protocol supported by said user's communication system (CS).

* * * * *